US012598201B2

(12) United States Patent
Methner et al.

(10) Patent No.: US 12,598,201 B2
(45) Date of Patent: Apr. 7, 2026

(54) MULTIFACETED DETECTION OF FRAUDULENT DATA USAGE

(71) Applicant: Verizon Patent and Licensing Inc., Basking Ridge, NJ (US)

(72) Inventors: Jacob Methner, Natick, MA (US); Khurram Abbas, Novi, MI (US); Kevin Michael Robinson, Port Richey, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 309 days.

(21) Appl. No.: 18/051,565

(22) Filed: Nov. 1, 2022

(65) Prior Publication Data

US 2024/0146750 A1 May 2, 2024

(51) Int. Cl.
*H04L 9/40* (2022.01)

(52) U.S. Cl.
CPC ...... *H04L 63/1425* (2013.01); *H04L 63/1416* (2013.01)

(58) Field of Classification Search
CPC ........................ H04L 63/1425; H04L 63/1416
USPC ........................................................ 726/23
See application file for complete search history.

(56) References Cited

U.S. PATENT DOCUMENTS

| | | | | |
|---|---|---|---|---|
| 10,872,341 | B1 * | 12/2020 | Beckman | ................ G06F 17/18 |
| 12,149,559 | B1 * | 11/2024 | Fullen | .................. H04L 63/145 |
| 2020/0120458 | A1 * | 4/2020 | Aldana | ................. H04W 28/22 |
| 2022/0159022 | A1 * | 5/2022 | Aghamirzaei | ..... G06Q 30/0248 |
| 2022/0201010 | A1 * | 6/2022 | Tarsauliya | .............. G06F 21/44 |

* cited by examiner

*Primary Examiner* — Linglan Edwards
*Assistant Examiner* — Phuc Pham

(57) ABSTRACT

A method, a network device, and a non-transitory computer-readable storage medium are described in relation to a multifaceted detection of fraudulent data usage service. The multifaceted detection of fraudulent data usage service may apply fraudulent detection to multiple facets of network usage including end device identifier analysis, end device registration analysis, traffic analysis, and end device examination analysis. The multifaceted detection of fraudulent data usage service may include weightings and scoring associated with the examinations.

20 Claims, 7 Drawing Sheets

500

SELECT AN END DEVICE FOR FRAUDULENT EXAMINATION
505

EXAMINE END DEVICE IDENTIFIER
510

EXAMINE END DEVICE REGISTRATION
515

EXAMINE USER TRAFFIC
520

EXAMINE END DEVICE
525

CALCULATE A SCORE VALUE
530

NO          FRAUD DETECTED?          YES
535

END
545

INVOKE REMEDIAL
PROCEDURE
540

MULTIFACETED DETECTION OF FRAUDULENT DATA USAGE

BACKGROUND

Network security is an important piece in providing network services to users. Additionally, network operators and other entities need to address such concerns to maintain network integrity, performance, and reduce operational and/or maintenance costs. For example, some users may abuse network restrictions to maximize their data usage.

DETAILED DESCRIPTION

Figure 1:
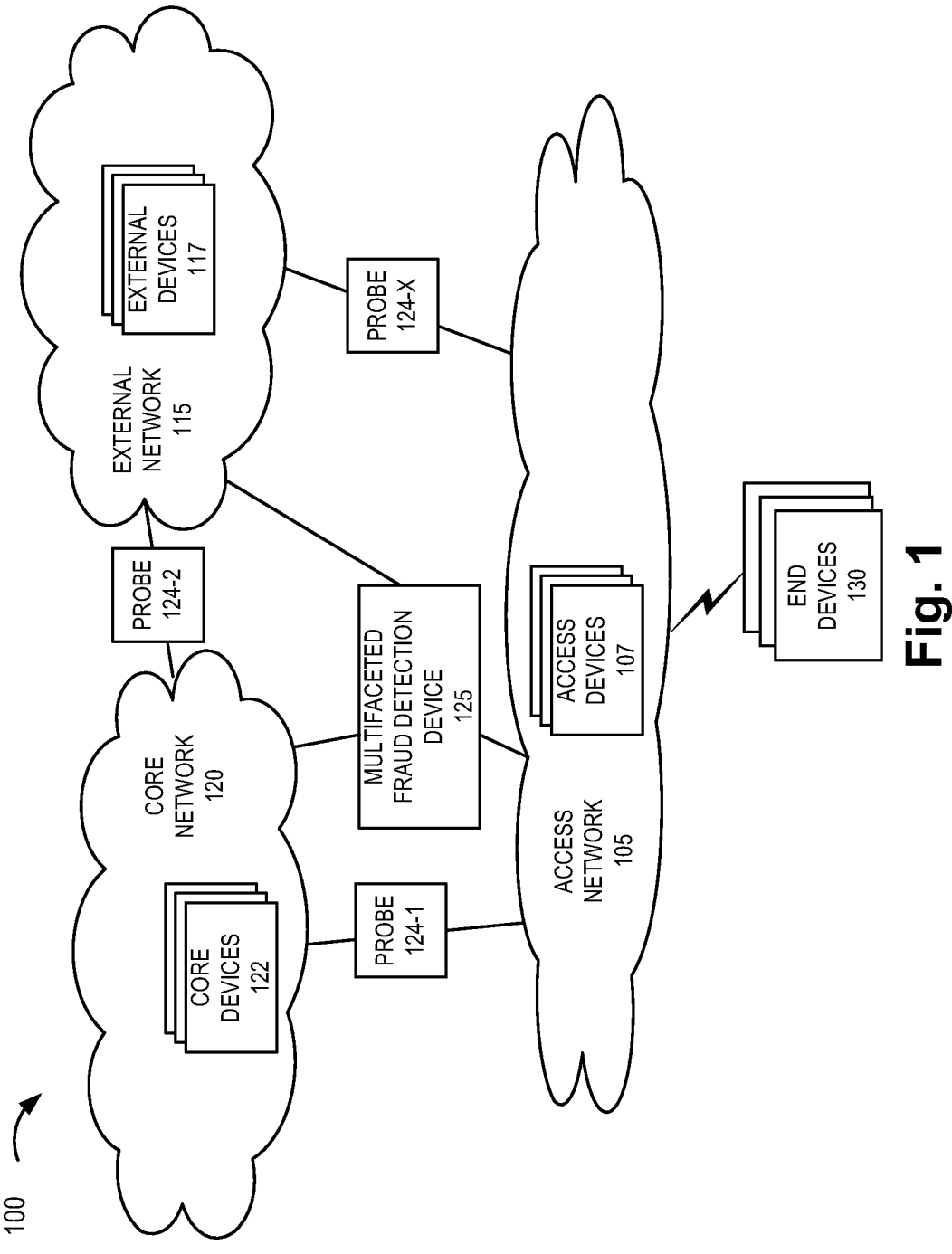
FIG. 1 is a diagram illustrating an exemplary environment in which an exemplary embodiment of a multifaceted detection of fraudulent data usage service may be implemented.

The following detailed description refers to the accompanying drawings. The same reference numbers in different drawings may identify the same or similar elements. Also, the following detailed description does not limit the invention.

Data usage fraud may include a user bypassing network, plan, and/or legal qualifications or limitations to use an unusually large amount of data on the network. Additionally, some users may take advantage of grandfathered unlimited plans to consume significant data usage without paying for dedicated plans for their respective end devices. Absent detection, this type of nefarious behavior may trigger network upgrades due to unexpected or excessive utilization of bandwidth and resources, degrade network performance, reduce quality of service for other users, and cause revenue loss for a network operator, among other things. A further complication to this issue stems from the various techniques used by illegitimate users and the corresponding detection and analytics needed to detect fraudulent data usage, as well as providing such detection across multiple networks, such as a radio access network (RAN), a core network, an application service layer network, an X-haul network, and/or another type of network.

According to exemplary embodiments, a multifaceted detection of fraudulent data usage service is described. According to an exemplary embodiment, the multifaceted detection of fraudulent data usage service applies fraudulent detection to multiple facets of network usage including end device identifier analysis, end device registration analysis, traffic analysis, and end device examination analysis. For example, the end device identifier analysis may include analysis pertaining to a unique identifier of the end device or portion thereof (e.g., International Mobile Equipment Identity (IMEI), Type Allocation Code (TAC), IMEI Software version (IMEISV), or the like) for identifying an unauthorized end device, as described herein. The end device registration analysis may include analysis pertaining to initial and continued registrations of an end device, as described herein. The end device registration analysis may include analysis of end device characteristic information (e.g., end device capability information, User-Agent header information, or the like) for identifying fraudulent data usage, as described herein. The traffic analysis may include detection pertaining to tethering masking, application service profiling, and/or Internet Protocol (IP) address manipulation, as described herein. The end device examination analysis may include operation system (OS), network port, and configuration examination associated with the end device for identifying fraudulent activity, as described herein. According to other exemplary embodiments, additional and/or different facets of end device use of a network may be analyzed for fraudulent detection of data usage and/or other types of fraudulent activity, as described herein. According to an exemplary embodiment, the multifaceted detection of fraudulent data usage service may pertain to an end device, a user of the end device, or both (referred to herein simply as "end device").

According to some exemplary embodiments, the multifaceted detection of fraudulent data usage service may select an end device for examination of potentially fraudulent activity based on historical usage data. For example, the historical usage data may relate to billing records associated with the end device and/or a degree of data usage (e.g., heavy, abnormal, etc.) over a time period, as described herein. According to other exemplary embodiments, the multifaceted detection of fraudulent data usage service may select an end device for examination of potentially fraudulent activity based on other criteria and/or randomly.

According to an exemplary embodiment, the multifaceted detection of fraudulent data usage service may score the result of each type or category of examination. According to exemplary embodiment, the score for each type or category of examination may be weighted. For example, the multifaceted detection of fraudulent data usage service may assign a greater weighted value to one type of examination than another type of examination. According to an exemplary embodiment, the multifaceted detection of fraudulent data usage service may calculate a final score to the multifaceted examination for fraudulent data usage. According to an exemplary embodiment, the multifaceted detection of fraudulent data usage service may compare the final score to a threshold value. Depending on the result of the comparison, the multifaceted detection of fraudulent data usage service may determine whether fraudulent data usage has occurred, which may be attributable to the end device and/or a user of the end device.

In view of the foregoing, the multifaceted detection of fraudulent data usage service may enhance detection of fraudulent activity by end devices/users by providing a multi-layered approach. Additionally, an aggregation of various techniques and device perspectives, as described herein, may enable a higher degree of certainty that fraudulent activity has occurred, and remedial measures may be invoked.

FIG. 1 is a diagram illustrating an exemplary environment 100 in which an exemplary embodiment of a multifaceted detection of fraudulent data usage service may be implemented. As illustrated, environment 100 includes an access network 105, an external network 115, and a core network 120. Access network 105 includes access devices 107 (also referred to individually or generally as access device 107).

External network 115 includes external devices 117 (also referred to individually or generally as external device 117). Core network 120 includes core devices 122 (also referred to individually or generally as core device 122). Environment 100 further includes probes 124-1 through 124-X (also referred to collectively as probes 124, and individually or generally as probe 124), a multifaceted fraud detection device 125, and end devices 130 (also referred to individually or generally as "end device 130").

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), virtual, logical, network slice, etc.). The number, the type, and the arrangement of network devices are exemplary. For example, multifaceted fraud detection device 125 may be combined in whole or in part, respectively, with access device 107, external device 117, core device 122, and/or probe 124 to provide one or more services, steps, functions, and/or procedures of the multifaceted detection of fraudulent data usage service, as described herein.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the multifaceted detection of fraudulent data usage service may use at least one of these planes of communication. Additionally, an interface of a network device may be modified (e.g., relative to an interface defined by a standards body, such as Third Generation Partnership Project (3GPP), 3GPP2, International Telecommunication Union (ITU), European Telecommunications Standards Institute (ETSI), GSM Association (GSMA), and the like) or a new interface of the network device may be provided in order to support the communication (e.g., transmission and reception of messages, an information element (IE), an attribute value pair (AVP), an object, a header, a parameter, or another form of a data instance) between network devices and the multifaceted detection of fraudulent data usage service logic of the network device. According to various exemplary implementations, the interface of the network device may be a service-based interface, a reference point-based interface, an Open Radio Access Network (O-RAN) interface, a Fifth Generation (5G) interface, another generation of interface (e.g., 5.5G, Sixth Generation (6G), Seventh Generation (7G), etc.), or some other type of network interface.

Access network 105 may include one or multiple networks of one or multiple types and technologies. For example, access network 105 may be implemented to include a 5G RAN, a future generation RAN (e.g., a 6G RAN, a 7G RAN, or a subsequent generation RAN), a centralized-RAN (C-RAN), an O-RAN, and/or another type of access network. Access network 105 may include a legacy RAN (e.g., a Third Generation (3G) RAN, a Fourth Generation (4G) or 4.5 RAN, etc.). Access network 105 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105.

Access network 105 may include different and multiple functional splitting, such as options 1, 2, 3, 4, 5, 6, 7, or 8 that relate to combinations of access network 105 and a core network including an Evolved Packet Core (EPC) network and/or an NG core (NGC) network (not illustrated), or the splitting of the various layers (e.g., physical layer, media access control (MAC) layer, radio link control (RLC) layer, and packet data convergence protocol (PDCP) layer, etc.), plane splitting (e.g., user plane, control plane, etc.), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA) (e.g., intra-band, inter-band, contiguous, non-contiguous, etc.), edge and core network slicing, coordinated multipoint (CoIVIP), various duplex schemes (e.g., frequency division duplex (FDD), time division duplex (TDD), half-duplex FDD (H-FDD), etc.), and/or another type of connectivity service (e.g., NSA new radio (NR), SA NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of cell architecture. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a next generation Node B (gNB), an evolved Long Term Evolution (eLTE), an evolved Node B (eNB), a radio network controller (RNC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. According to some exemplary implementations, access device 107 may include a combined functionality of multiple RATs (e.g., 4G and 5G functionality, 5G and 5.5G functionality, etc.) via soft and hard bonding based on demands and needs. According to some exemplary implementations, access device 107 may include an integrated functionality, such as a CU-CP and a CU-UP, or other integrations of split RAN nodes. Access device 107 may be an indoor device or an outdoor device.

According to an exemplary embodiment, at least some of access devices 107 may include logic of the multifaceted detection of fraudulent data usage service, as described herein. For example, access device 107 may transmit and receive messages pertaining to the multifaceted detection of fraudulent data usage service, as described herein. For example, access device 107 may provide data pertaining to end device 130, which may be subject to the multifaceted detection of fraudulent data usage service, to multifaceted fraud detection device 125. Additionally, for example, access device 107 may obtain data pertaining to end device 130 based on a request from multifaceted fraud detection device 125. According to further examples, access device 107 may perform evaluation, examination, and/or analysis of the data for identifying fraudulent activity/data usage.

External network 115 may include one or multiple networks of one or multiple types and technologies that provide an application service. For example, external network 115 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, a data network, or other type of network that may provide access to and may host an end device application service.

Depending on the implementation, external network 115 may include various network devices such as external devices 117. For example, external devices 117 may include virtual network devices (e.g., virtualized network functions (VNFs), servers, host devices, application functions (AFs), application servers (ASs), server capability servers (SCSs), containers, hypervisors, virtual machines (VMs), network function virtualization infrastructure (NFVI), and/or other types of virtualization elements, layers, hardware resources, operating systems, engines, etc.) that may be associated with application services for use by end devices 130 (not illustrated). By way of further example, external devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). Although not illustrated, external network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), Internet of Things (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, conferencing, instant messaging), video streaming, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and/or external devices 117 that may pertain to various network-related functions (e.g., security, management, charging, billing, authentication, authorization, policy enforcement, development, etc.). External devices 117 may include non-virtual, logical, and/or physical network devices.

According to an exemplary embodiment, at least some of external devices 117 may include logic of the multifaceted detection of fraudulent data usage service, as described herein. For example, external device 117 may transmit and receive messages pertaining to the multifaceted detection of fraudulent data usage service, as described herein. For example, access device 107 may provide data pertaining to end device 130, which may be subject to the multifaceted detection of fraudulent data usage service, to multifaceted fraud detection device 125. Additionally, for example, external device 117 may obtain data pertaining to end device 130 based on a request from multifaceted fraud detection device 125. According to further examples, external device 117 may perform evaluation, examination, and/or analysis of the data for identifying fraudulent activity/data usage.

Core network 120 may include one or multiple networks of one or multiple network types and technologies. Core network 120 may include a complementary network of access network 105. For example, core network 120 may be implemented to include a 5G core network, an evolved packet core (EPC) of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF), a Non-3GPP Interworking Function (N3IWF), an access and mobility management function (AMF), a session management function (SMF), a unified data management (UDM) device, a unified data repository (UDR), an authentication server function (AUSF), a network slice selection function (NSSF), a network repository function (NRF), a policy control function (PCF), a network data analytics function (NWDAF), a network exposure function (NEF), a service capability exposure function (SCEF), a lifecycle management (LCM) device, a mobility management entity (MME), a packet data network gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

According to an exemplary embodiment, at least some of core devices 122 may include logic of the multifaceted detection of fraudulent data usage service, as described herein. For example, core device 122 may transmit and receive messages pertaining to the multifaceted detection of fraudulent data usage service, as described herein. For example, core device 122 may provide data pertaining to end device 130, which may be subject to the multifaceted detection of fraudulent data usage service, to multifaceted fraud detection device 125. Additionally, for example, core device 122 may obtain data pertaining to end device 130 based on a request from multifaceted fraud detection device 125. According to further examples, core device 122 may perform evaluation, examination, and/or analysis of the data for identifying fraudulent activity/data usage.

Probe 124 may include a device that captures data subject to examination. For example, probe 124 may tap, collect, read, and/or copy data transmitted, such as an optical traffic access point (TAP) or another type of network TAP and/or provide deep packet inspection (DPI), packet sniffing, or the like. According to an exemplary embodiment, probe 124 may perform an examination of the data in accordance with one or multiple types of examinations, as described herein. According to another exemplary embodiment, probe 124 may not perform an examination of the data but provide the data to another device (e.g., multifaceted fraud detection device 125 and/or another type of network device (e.g., access device 107, core device 122, external device 117, etc.)). According to some exemplary embodiments, access device 107, core device 122, and/or external device 117, for example, may include probe 124. According to other examples, a cell site route (CSR) may include probe 124. According to yet another example, probe 124 may be included in other types of network devices/systems, such as a traffic aggregation point (TAP), a service aggregation point (SAP), or other suitable nodes in the network. According to an exemplary embodiment, as illustrated, a communication link may include probe 124 (e.g., an intermediary device) that provides the multifaceted detection of fraudulent data usage service.

Multifaceted fraud detection device 125 may include a network device that includes logic of the multifaceted detection of fraudulent data usage service, as described herein. Although multifaceted fraud detection device 125 is depicted outside of access network 105, external network 115, and core network 120, such an illustration is exemplary. According to other exemplary implementations, multifaceted fraud detection device 125 may reside in one or multiple networks depicted and described herein. Additionally, multifaceted fraud detection device 125 may be implemented in a centralized, distributed, and/or another type of network and/or computing architecture as a network device or system, as described herein.

According to an exemplary embodiment, multifaceted fraud detection device 125 may include logic that provides fraudulent detection to multiple facets of network usage including end device identifier analysis, end device registration analysis, traffic analysis, and end device examination analysis, as described herein. According to an exemplary embodiment, multifaceted fraud detection device 125 may facilitate and/or coordinate a fraud detection procedure among one or multiple network devices, such as access device 107, external device 117, and/or core device 122 in relation to end device 130. Additionally, or alternatively, multifaceted fraud detection device 125 may facilitate and/or coordinate a fraud detection procedure in relation to an application service layer session, a quality of service (QoS) flow, a packet data unit (PDU) session, a PDN session, a bearer, a network slice, and/or a connection (e.g., end-to-end, a segment or portion of an end-to-end connection, etc.), a network procedure (e.g., registration, attachment, handover, session establishment, session teardown, local breakout, authentication, etc.), a message (e.g., control plane message, user plane message, user plane traffic, etc.), and/or another type of element associated with network usage or activity attributable to end device 130, a user of end device 130, or both, as described herein.

According to an exemplary embodiment, multifaceted fraud detection device 125 may calculate one or multiple scores associated with fraudulent detection. Multifaceted fraud detection device 125 may compare the score or scores to one or multiple threshold values. Multifaceted fraud detection device 125 may determine whether fraudulent activity has occurred based on a result of the comparison. According to other exemplary embodiments, multifaceted fraud detection device 125 may not calculate a score nor compare to a threshold value to determine whether fraudulent activity has occurred. Rather, multifaceted fraud detection device 125 may make this determination based on a result of the examination associated with a fraudulent detection procedure.

According to an exemplary embodiment, multifaceted fraud detection device 125 may invoke a remedial procedure when fraudulent activity has been determined. For example, multifaceted fraud detection device 125 may communicate with another network device (e.g., core device 122, access device 107, etc.) to initiate disconnection with end device 130 and/or prevent prospective network usage by end device 130.

End device 130 includes a device that may have communication capabilities (e.g., wireless, wired, optical, etc.). End device 130 may or may not have computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a wearable device (e.g., a watch, glasses, etc.), a computer, a gaming device, a music device, an IoT device, a drone, a smart device, a fixed wireless device, a router, a sensor, a Hum device, or other type of wireless device (e.g., other type of UE). End device 130 may include multiple end devices 130 when tethering is used. End device 130 may be configured to execute various types of software (e.g., applications, programs, etc.). The number and the types of software may vary among end devices 130. End device 130 may include "edge-aware" and/or "edge-unaware" application service clients. For purposes of description, end device 130 is not considered a network device.

According to an exemplary embodiment, end device 130 may include logic of the multifaceted detection of fraudulent data usage service, as described herein. For example, end device 130 may transmit and receive messages pertaining to the multifaceted detection of fraudulent data usage service, as described herein. For example, end device 130 may provide data pertaining to end device 130, which may be subject to the multifaceted detection of fraudulent data usage service, to multifaceted fraud detection device 125. Additionally, for example, end device 130 may obtain data pertaining to end device 130 based on a request from multifaceted fraud detection device 125 and/or another network device (e.g., access device 107, core device 122, external device 117, or another type of network device/system, as described herein). According to further examples, end device 130 may perform evaluation, examination, and/or analysis of the data for identifying fraudulent activity/data usage.

Figure 2:
FIG. 2 is a diagram illustrating another exemplary environment in which an exemplary embodiment of the multifaceted detection of fraudulent data usage service may be implemented.
Figure 2:
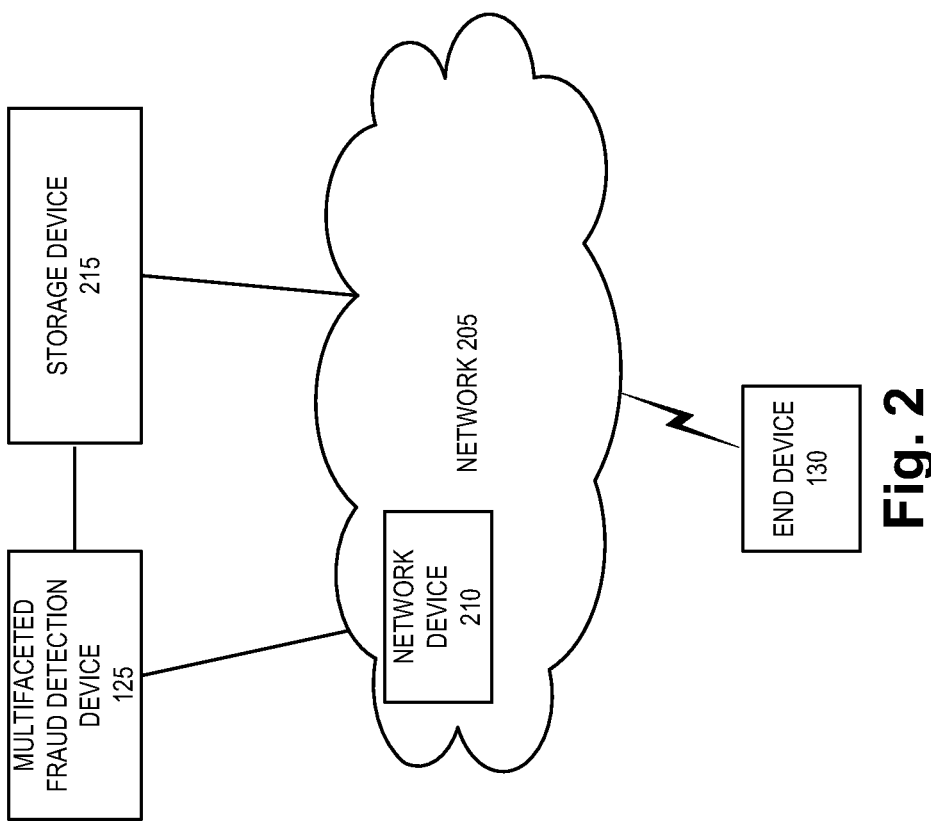

FIG. 2 is a diagram illustrating another exemplary environment 200 in which an exemplary embodiment of the multifaceted detection of fraudulent data usage service may be implemented. As illustrated, environment 200 may include a network 205, a network device 210, and a storage device 215. Environment 200 may further include probe 124, multifaceted fraud detection device 125, and end device 130, which have already been described. Similar to the description of environment 100, the number, type, and arrangement of network devices, end device 130, communication links, and so forth, may be different in other embodiments.

Network 205 may include access network 105, core network 120, external network 115, and/or other types of networks, as described herein. Network device 210 may include access device 107, external device 117, core device 122, probe 124, and/or another type of network device/system (e.g., a CSR, a TAP, a SAP, etc.), as described herein. Storage device 215 may include a network device that stores information that may be used by the multifaceted detection of fraudulent data usage service. For example, storage device 215 may store information that correlates and/or pertains to end devices 130. By way of further example, storage device 215 may store end device identifiers associated with end devices 130, users, and/or subscribers relating to a network service provider and/or network service. Storage device 215 may correlate the end device identifiers to various types of information, such as subscriber plans, end device information (e.g., device manufacturer, model number, software version, operating system (OS), network ports used, or the like), applications (e.g., hostnames, fully qualified domain names (FQDNs), access point names (APNs), etc.) used by a specific manufacturer or device type, and/or another type of instance of data that may indicate a characteristic of end device 130. According to various exemplary embodiments, network device 205 and/or multifaceted fraud detection device 125 may have access and query storage device 215 so as to perform an examination procedure.

Figure 3A:
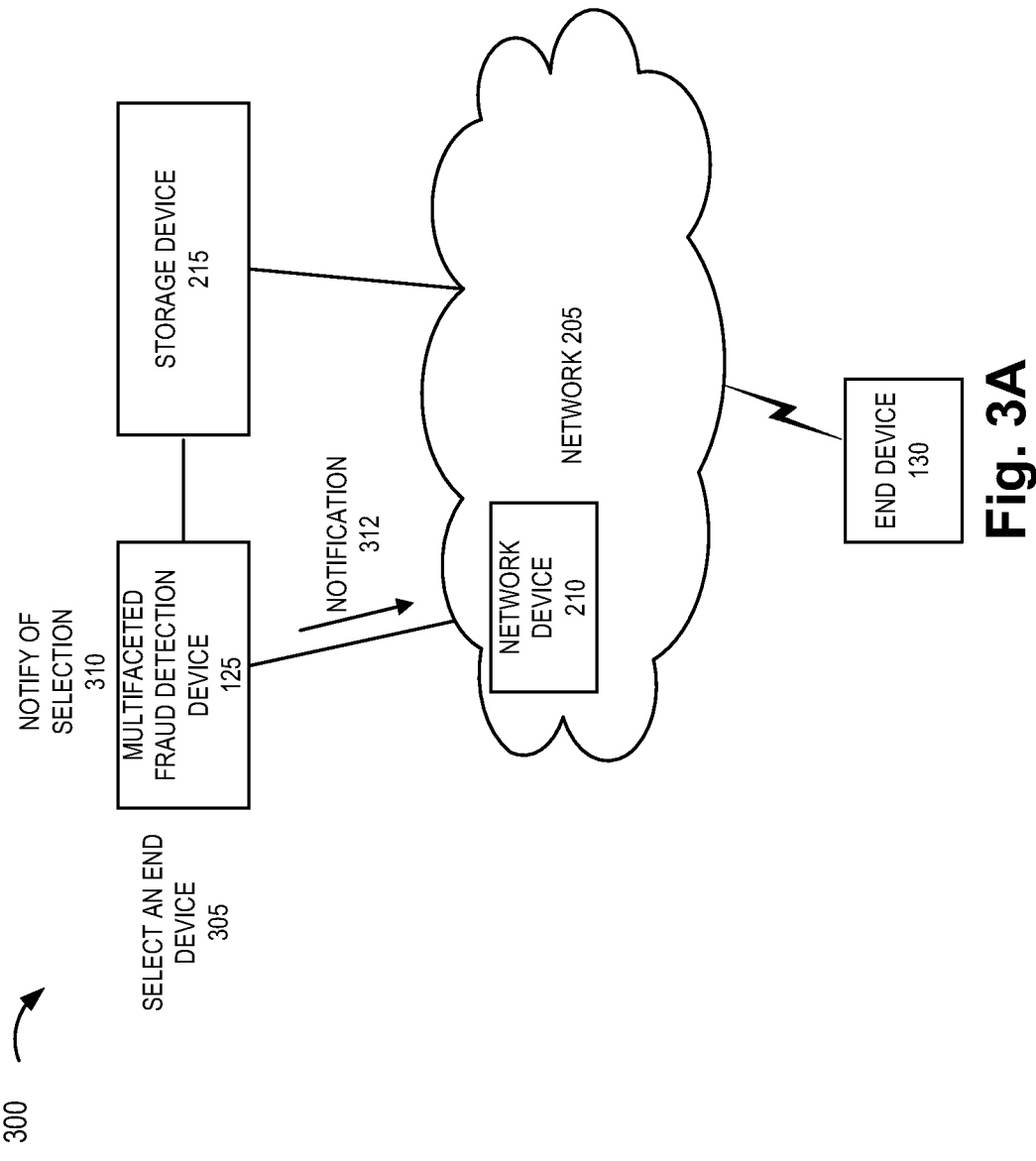
FIGS. 3A-3C are diagrams illustrating an exemplary process of an exemplary embodiment of the multifaceted detection of fraudulent data usage service.
Figure 3B:
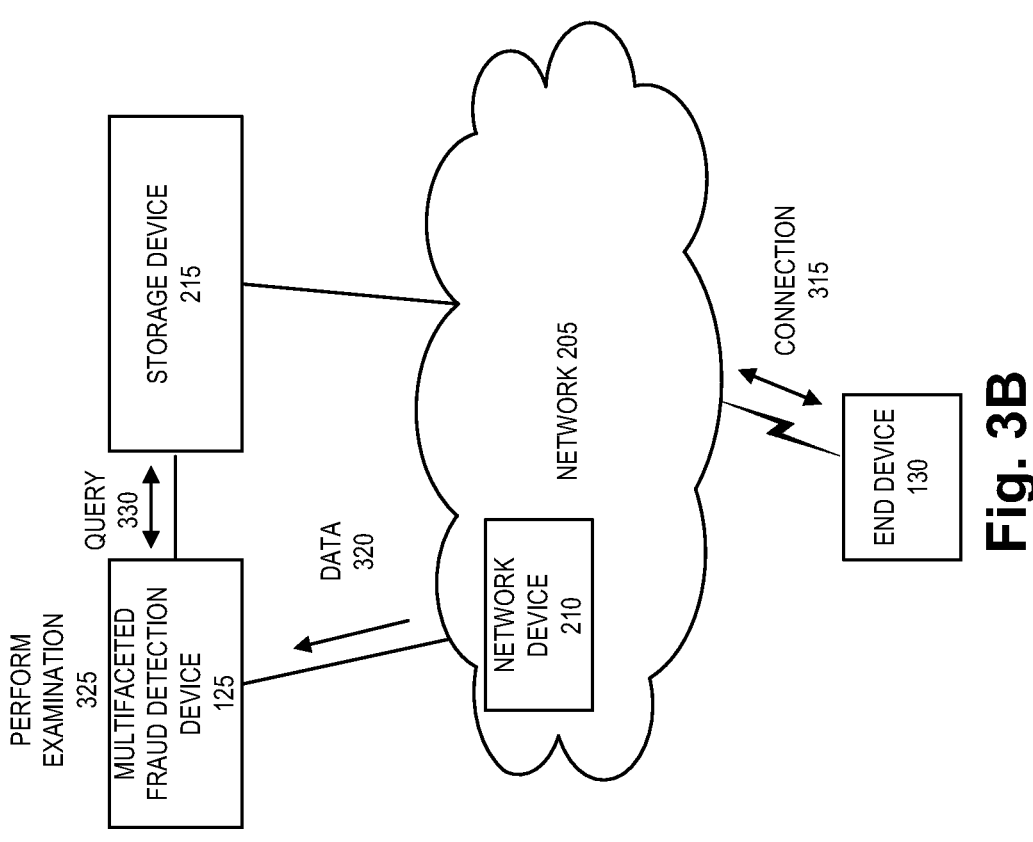
Figure 3B:
Figure 3C:
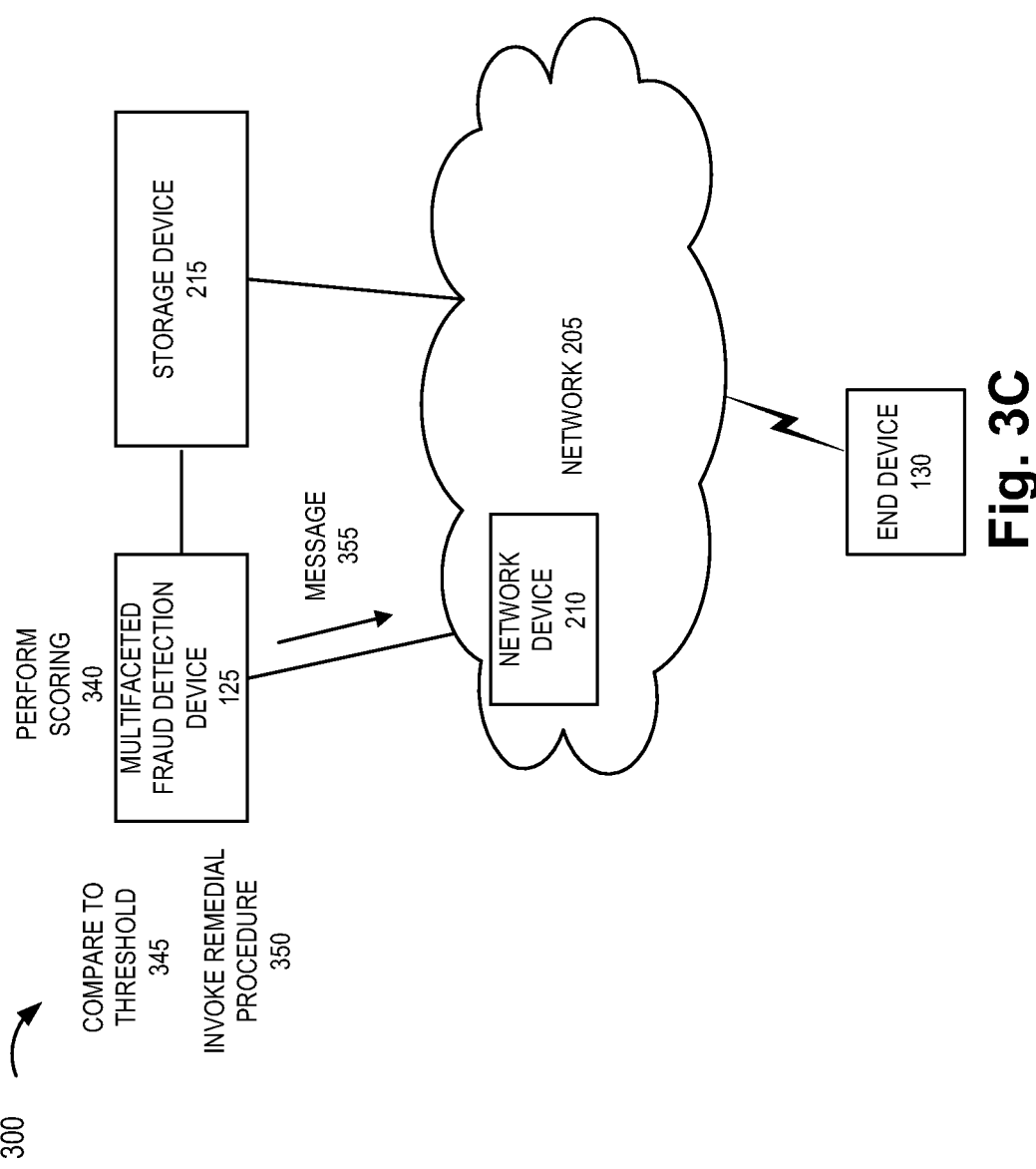

FIGS. 3A-3C are diagrams illustrating an exemplary process 300 of an exemplary embodiment of the multifaceted detection of fraudulent data usage service. Although steps, procedures, functions, or the like of process 300 are described and/or illustrated as being performed by a particular network device, according to other exemplary embodiments, one or more of the steps, procedures, functions, or the like of process 300 may be performed by a different network device. For example, a step, a procedure, a function, or the like of process 300 described as being performed by multifaceted fraud detection device 125, according to other exemplary embodiments, access device 107, external device 117, core device 122, or probe 124 may perform such step, procedure, function, or the like, in whole or in part. Similarly, a step, a procedure, a function, or the like of process 300 described as being performed by access device 107, external device 117, core device 122, or probe 124, for example, according to other exemplary embodiments, multifaceted fraud detection device 125 may perform such step, procedure, function, or the like, in whole or in part.

As illustrated, referring to FIG. 3A, in step 305, multifaceted fraud detection device 125 may select end device 130 to be subject to the multifaceted detection of fraudulent data usage service. According to some exemplary implementations, multifaceted fraud detection device 125 may make this selection based on billing and/or charging records and/or data usage that is exceedingly high. Although not illustrated, according to some exemplary implementations, multifaceted fraud detection device 125 may receive billing, charging, and/or data usage information from one or more core devices, such as a charging function (CHF), a PCEF, an online charging function (OCF), a CS, an HSS, a UDR, or another type of network device. According to other exemplary implementations, multifaceted fraud detection device 125 may make the selection based on other types of criteria. According to other exemplary embodiments, the one or more core devices and/or a proprietary network device may make such a selection.

In step 310, multifaceted fraud detection device 125 may notify network device 210 of the selection via a notification 312. Notification 312 may include the end device identifier and data indicating that end device 130 is subject to examination procedures of the multifaceted detection of fraudulent data usage service, as described herein. According to some exemplary embodiments, multifaceted fraud detection device 125 may identify an end device identifier (e.g., IMEI, etc.) of the selected end device 130 based on information stored at storage device 215. According to various exemplary scenarios, the selection and notification may be performed while end device 130 is active or connected to network 205, or when end device 130 may not be connected to network 205 (e.g., prospectively).

Referring to FIG. 3B, according to this exemplary scenario, assume end device 130 establishes a connection 315 with network 205. During the connection establishment procedure, an end device identifier examination procedure may be performed. For example, control plane signaling, such as a radio resource control (RRC) message and/or control plane message to the core network (e.g., associated with an authentication procedure, a registration procedure, etc.), an end device identifier of end device 130 may be obtained by network device 210 (e.g., access device 107, core device 122, probe 124, etc.). The end device identifier may be an IMEI or an IMEISV, for example. As illustrated, network device 210 may transmit data 320 to multifaceted fraud detection device 125. Data 320 may include the end device identifier. Data 320 may also include data that identifies the type of examination procedure for which data 320 is to be used. In response to receiving data 320, multifaceted fraud detection device 125 may perform an examination 325 using data 320. For example, multifaceted fraud detection device 125 may query 330 storage device 215 and analyze the TAC of the IMEI or the IMEISV using end device information obtained from query 330. Based on a comparison of the TAC to the end device information, multifaceted fraud detection device 125 may determine whether end device 130 is an authorized device or not. For example, multifaceted fraud detection device 125 may determine whether end device 130 is a certified, compatible, or network operator device versus a third party device (e.g., an LTE/5G router or another type of end device 130). Additionally, or alternatively, multifaceted fraud detection device 125 may determine that the type of end device 130 indicated by the TAC does not match the subscription plan under which end device 130 is billed. For example, a mobile hotspot device may be on a smartphone plan.

Referring again to FIG. 3B, multifaceted fraud detection device 125 may perform an end device registration examination procedure. For example, as a part of initial registration with network 205 (e.g., including core network 120), network 205 may request a capability report from end device 130. Alternatively, end device 130 may provide (e.g., without a request from network 205) a capability report to network 205. As an example, the capability report may be implemented as a network capability and radio capability report. The network capability report may include information indicating supported algorithms for encryption and integrity, and the radio capability report may include information indicating UE capability band combinations and UE band capability (e.g., EUTRA capability, NR capability, etc.).

Similar to that described, network device 210 may transmit data 320 to multifaceted fraud detection device 125. Data 320 may include the capability report. Data 320 may include the end device identifier. Data 320 may also include data that identifies the type of examination procedure for which data 320 is to be used. In response to receiving data 320, multifaceted fraud detection device 125 may perform an examination 325 using data 320. For example, multifaceted fraud detection device 125 may query 330 storage device 215 and analyze the TAC of the IMEI or the IMEISV using end device information obtained from query 330. For example, based on the model and/or the model and SV, end device 130 should have a correlated capability (e.g., based on a TAC range). Based on a comparison of the TAC to the end device information, multifaceted fraud detection device 125 may determine whether the capabilities match. As an example, when the capabilities do not match, end device 130 may have had its end device identifier modified and be considered an unauthorized device. Based on this determination, multifaceted fraud detection device 125 may deem the network usage of end device 130 as fraudulent. Otherwise, if the capabilities do match, multifaceted fraud detection device 125 may determine that end device 130 may be an authorized device according to this particular examination procedure.

Multifaceted fraud detection device 125 may perform an end device registration examination procedure that relates to continued registration with an application service layer network. For example, an IMS network, a MEC network, or another type of application service layer network may be configured to require that end device 130 initially registers and re-registers according to a prescribed time or schedule. As an example, the IMS network may require that end device 130 registers and re-registers with the IMS network every two hours (or another configurable time period) while end device 130 remains connected to the IMS network. For example, this requirement may be applicable to end device 130 due to its capabilities (e.g., voice capability, short messaging service (SMS) capability, etc.). When end device 130 fails to satisfy this requirement (e.g., fails to initially register and/or fails to re-register according to a prescribed time period or schedule), for example, external device 117 may transmit data 320 to multifaceted fraud detection device 125. Data 320 may include the end device identifier and data indicating the failure of end device 130 to properly register with the application service layer network. Multifaceted fraud detection device 125 may query 330 storage device 215, determine the capabilities of end device 130 associated with application service layer network, and determine whether end device 130 is an authorized device or not. Additionally, if end device 130 registers with an application service layer network, as a part of the registration procedure, a message from end device 130 may include a user-agent field. The user-agent field may include end device information (e.g., manufacturer, model number, software version, and/or other characteristic information), which may be compared to end device information stored at storage device 215. Based on a comparison, multifaceted fraud detection device 125 may determine whether end device 130 is an authorized device or not.

Referring to FIG. 3B yet again, multifaceted fraud detection device 120 may perform a user traffic examination procedure. For example, in relation to the fraudulent activity of tethering masking, a fraudulent data user may manipulate standard time-to-live (TTL) parameters of a packet in order to make data usage of a tethered device appear to be from or attributable to end device 130 and thus bypass tethering data usage limits. As previously described, a user-agent field may be included in messages to application service layer network device (e.g., external device 117). As an example, a user-agent field of an HTTP packet may include end device information. Network device 210 may provide data 320, which includes the user-agent header information. Multifaceted fraud detection device 125 may compare this information to end device information and determine whether the end device identifier has been modified. In this way, the user-agent information stemming from traffic of a tethered device may be used to detect and prove data usage fraud.

According to another examination of user traffic, multifaceted fraud detection device 125 may identify application layer services used by specific end device manufacturers and/or device types (e.g., mobile phone, tablet, router, tethered device, etc.). According to an exemplary embodiment, storage device 215 may store end device profile information, which may correlate end device information to application layer service information. For example, the application layer service information may include a hostname, an APN, an IP address, a DNS query, or the like relating to an application service. According to exemplary implementation, the end device profile information may be generated based on user traffic monitoring. For example, a fraudulent data usage attributable to torrenting may enable the generation of an end device profile. According to another example, the monitoring of user traffic among multiple end devices 130 may enable the generation of multiple end device profile associated with a diverse array of end devices 130.

Accordingly, network device 210 may transmit data 320, which may include application layer service information, to multifaceted fraud detection device 125. Based on the end device profile information obtained via query 330, multifaceted fraud detection device 125 may determine whether fraudulent activity has occurred. For example, if there is frequent user traffic from an application related service (e.g., the MICROSOFT WINDOWS® update service), the user may be masking a tethered device and bypassing network tethering data usage limits. By way of further example, the end device identifier of end device 130, such as smartphone of a particular model and/or manufacturer, would not be communicating with a MICROSOFT WINDOWS® update server.

According to yet another examination of user traffic, fraudulent users may reset their network connection by forcing network attachments multiple times per hour (or other time period) to prevent user traffic capture in real-time. In comparison, normal users may not reset network connectivity frequently. Due to the frequent connection and disconnection procedure of end device 130, end device 130 may obtain a new IP address each cycle and consequently this creates a difficulty in monitoring its user traffic, as mentioned above. Network device 210 may detect this unusual behavior or log each attachment/detachment procedure associated with end device 130 and transmit data 320 indicating such occurrence or multiple occurrences to multifaceted fraud detection device 125. In response to receiving data 320 and as a part of performing examination 325, multifaceted fraud detection device 125 may determine or confirm whether end device 130 has exceeded or satisfied a threshold value of a number of attachments/detachments within a time period. If so, multifaceted fraud detection device 125 may invoke a static IP address assignment procedure. For example, the static IP address assignment procedure may enable network device 205 (e.g., a PGW, a UPF) to assign end device 130 a static IP address such that the user traffic of end device 130 may be monitored and examined according to one or more of the examinations described herein. According to some exemplary embodiments, multifaceted fraud detection device 125 may host a pool of static IP addresses, which may be provided to network device 205. Additionally, or alternatively, multifaceted fraud detection device 125 may instruct network device 205 to assign a static IP address (or the selected static IP address by multifaceted fraud detection device 125) to end device 130. According to some exemplary embodiments, multifaceted fraud detection device 125 or via a network provisioning system configure access device 107, core device 122 (e.g., other than PGW or UPF), external device 117, etc., with an indication that end device 130 having the static IP address is subject to the multifaceted detection of fraudulent data usage service.

Referring to FIG. 3B again, multifaceted fraud detection device 125 may perform an end device examination procedure. According to an exemplary embodiment of the end device examination procedure, end device 130 may be queried to provide data indicating the OS of end device 130. As an example, either through control plane or user plane messaging, network device 210 or multifaceted fraud detection device 125 via network device 210 may transmit a packet to end device 130. By utilizing a stack (e.g., TCP/IP stack) of end device 130, end device 130 may transmit a response, which may be analyzed to determine the OS executing on end device 130. Multifaceted fraud detection device 125 may receive data 320, which may include the response information (e.g., OS). In response, based on the end device identifier of end device 130, multifaceted fraud detection device 125 may query 330 storage device 215 to obtain the OS that may be indicated by the TAC of the end device identifier stored in storage device 215. Multifaceted fraud detection device 125 may determine whether the OS matches. As an example, if an IPHONE® is queried and replies that it is running LINUX® OS instead of IOS®, multifaceted fraud detection device 125 may determine an end device identifier modification and an unauthorized device.

According to another implementation of end device examination, active ports used by end device 130 for communicating user traffic, may be compared to common or typical ports used for application layer services, such as Secure Shell (SSH), torrents, and server hosting. As an example, network device 205 may scan port usage associated with user traffic, provide this information to multifaceted fraud detection device 125 (e.g., data 320), and multifaceted fraud detection device 125 may query 330 storage device 215, and compare data 320 to port number and application service information stored by storage device 215. Based on a result of the comparison, multifaceted fraud detection device 125 may determine whether fraudulent data usage is occurring or not.

According to yet another implementation of end device examination, end device 130 may include (carrier-level) diagnostic, monitoring, and/or a similar type of system software built in. The system software may collect or derive data that may indicate the types of applications, features, and/or settings on end device 130. The collected or derived data may be provided to multifaceted fraud detection device 125 as data 320. In response multifaceted fraud detection device 125 may determine whether end device 130 may determine whether fraudulent activity may occur or has occurred. For example, if end device 130 hosts an application used for masking tethered device data usage and has used the application, multifaceted fraud detection device 125 may determine that fraudulent data usage has occurred.

Referring to FIG. 3C, according to an exemplary embodiment of process 300, in step 340, multifaceted fraud detection device 125 may perform scoring. For example, multifaceted fraud detection device 125 may calculate a scoring value based on the fraud detection examinations performed. According to some exemplary implementations, multifaceted fraud detection device 125 may calculate a scoring value for each examination (e.g., end device identifier examination, OS detection examination, etc.) or each category of examination (e.g., user traffic examination, end device examination, etc.). Additionally, or alternatively, multifaceted fraud detection device 125 may calculate an aggregate scoring value indicative of the results of the examinations performed. The aggregated scoring value may be calculated based on a summation, averaging, and/or another statistical method using scoring values associated with each examination or each category of examination. According to some exemplary embodiments, a scoring value may be weighted. For example, a weighted value may be based on the amount of data and/or the number of occurrences examined. In this regard, the weighted value may be the same or not the same among different examinations.

In step 345, multifaceted fraud detection device 125 may compare the aggregate scoring value to a threshold value. When the threshold value is satisfied, multifaceted fraud detection device 125 may determine that fraudulent activity (e.g., fraudulent data usage, etc.) has occurred. In step 350, multifaceted fraud detection device 125 may invoke a remedial procedure. For example, multifaceted fraud detection device 125 may transmit a message 355 to network device 210. Message 355 may include the end device identifier of end device 130 and data indicating that fraudulent activity has been detected. The remedial procedure may prevent current network usage and/or prospective network usage by end device 130. When the threshold value is not satisfied, multifaceted fraud detection device 125 may log the examinations and result, for example.

According to other exemplary embodiments and scenarios, process 300 may include additional operations, fewer operations, and/or different operations than those illustrated and described.

Figure 4:
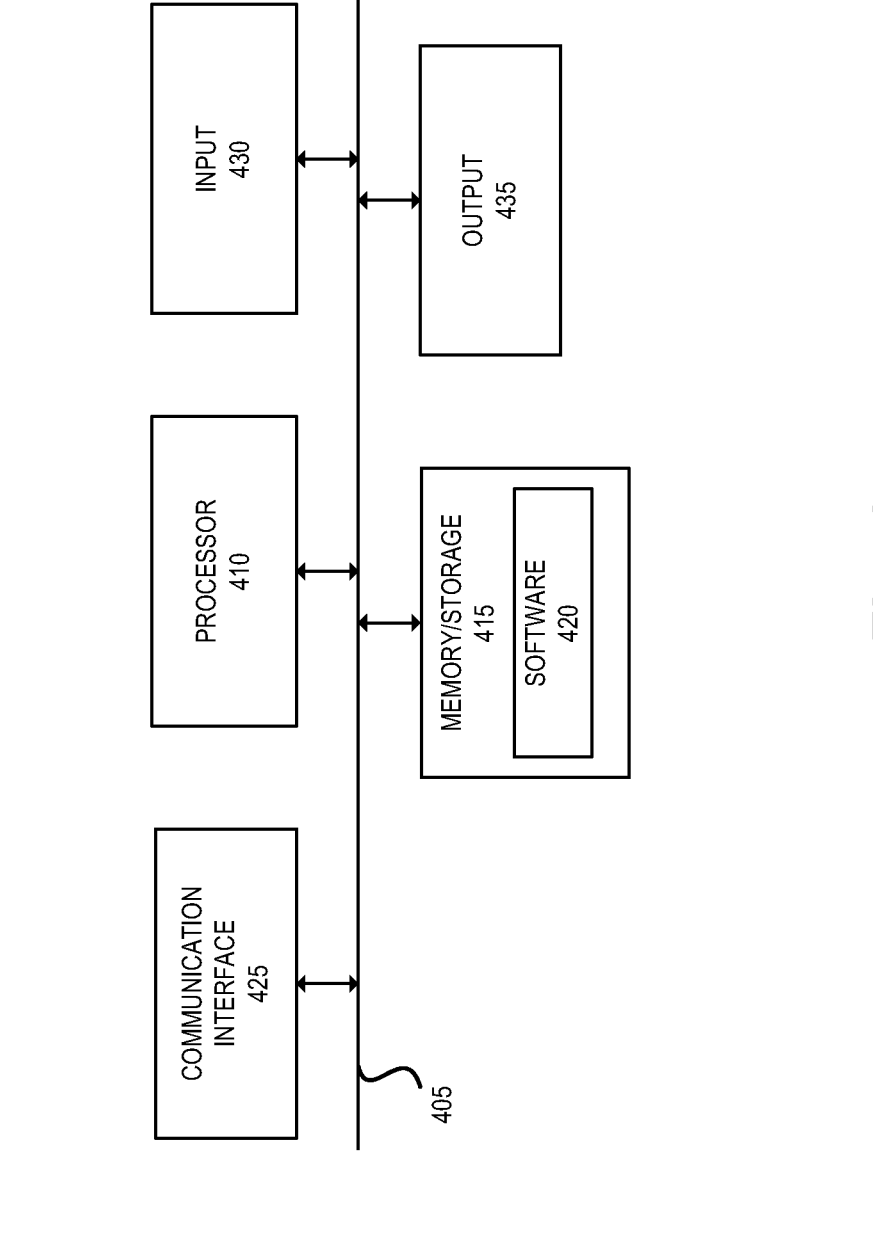
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to access device 107, external device 117, core device 122, probe 124, multifaceted fraud detection device 125, end device 130, network device 205, and/or other types of devices, as described herein. As illustrated in FIG. 4, device 400 includes a bus 405, a processor 410, a memory/ storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/ storage 415 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 415 may be external to and/or removable from device 400, such as, for example, a Universal Serial Bus (USB) memory stick, a dongle, a hard disk, mass storage, off-line storage, or some other type of storing medium. Memory/storage 415 may store data, software, and/or instructions related to the operation of device 400.

Software 420 includes an application or a program that provides a function and/or a process. As an example, with reference to multifaceted fraud detection device 125, software 420 may include an application that, when executed by processor 410, provides a function and/or a process of multifaceted detection of fraudulent data usage service, as described herein. Additionally, for example, with reference to access device 107, core device 122, and/or external device 117, software 420 may include an application that, when executed by processor 410, provides a function and/or a process of multifaceted detection of fraudulent data usage service, as described herein. Software 420 may also include firmware, middleware, microcode, hardware description language (HDL), and/or another form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces, optical interfaces, and/or wired interfaces. For example, communication interface 425 may include one or multiple transmitters and receivers, or transceivers. Communication interface 425 may operate according to a protocol stack and a communication standard.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 400 may be implemented in the same manner. For example, device 400 may be instantiated, created, deleted, or some other operational state during its life cycle (e.g., refreshed, paused, suspended, rebooting, or another type of state or status), using well-known virtualization technologies. For example, access device 107, core device 122, external device 117, and/or another type of network device or end device 130, as described herein, may be a virtualized device.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5:
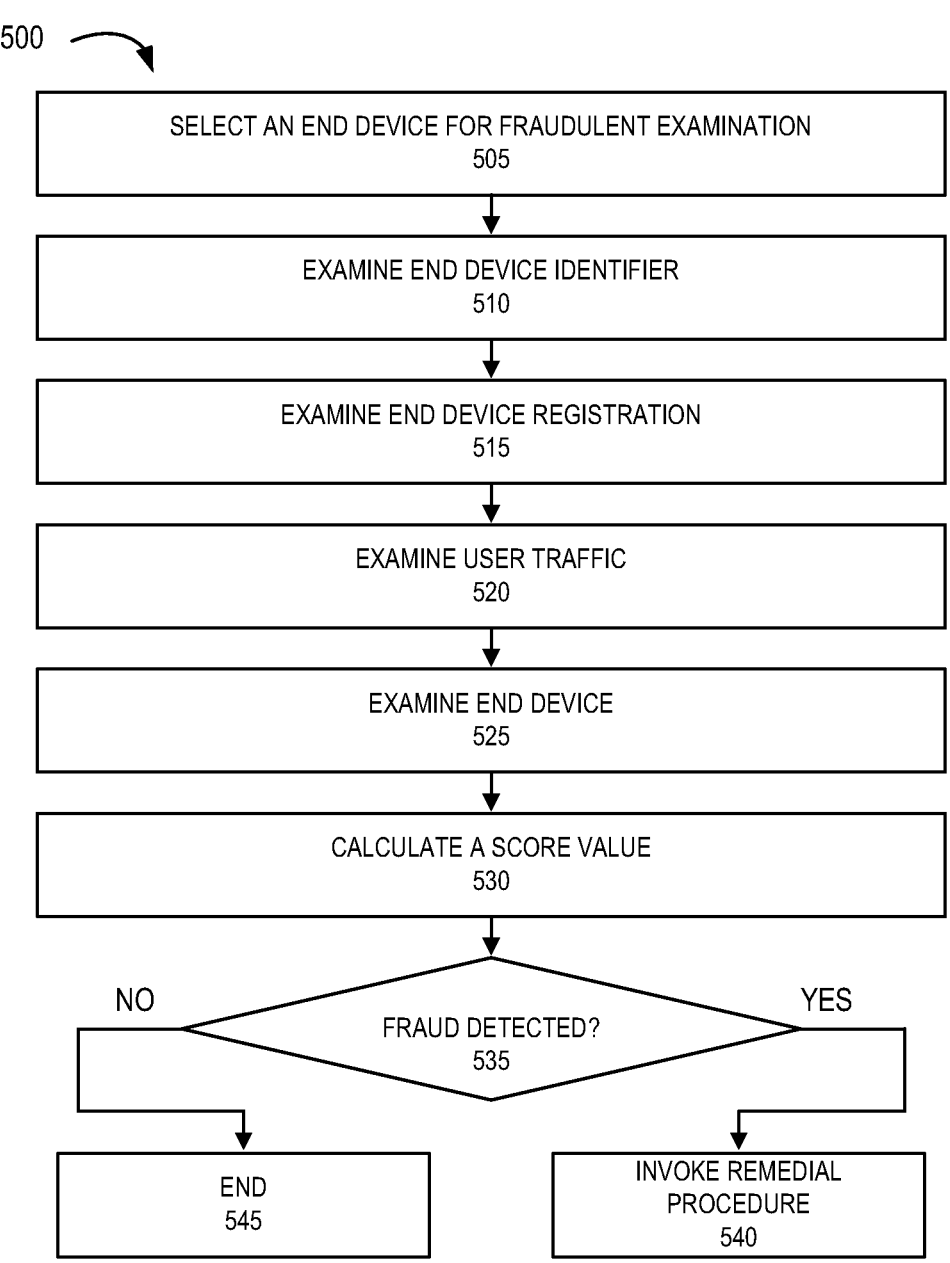
FIG. 5 is a flow diagram illustrating another exemplary process of an exemplary embodiment of the multifaceted detection of fraudulent data usage service.

FIG. 5 is a flow diagram illustrating an exemplary process 500 of an exemplary embodiment of the multifaceted detection of fraudulent data usage service. According to an exemplary embodiment, multifaceted fraud detection device 125 may perform a step of process 500. According to another exemplary embodiment, access device 107, core device 122, external device 117, or probe 124 may perform a step of process 500. According to yet other exemplary embodiments, a step of process 500 may be performed by a combination of network devices, such as multifaceted fraud detection device 125 and one or more of access device 107, core device 122, probe 124, or external device 117. For example, access device 107, core device 122, probe 124, or external device 117 may obtain data for examination, and multifaceted fraud detection device 125 may analyze the data according to a fraud examination procedure. According to an exemplary implementation, processor 410 executes software 420 to perform a step of process 500, as described herein. Alternatively, a step may be performed by execution of only hardware.

For purposes of description, process 500 is described as performed by multifaceted fraud detection device 125.

In block 505, multifaceted fraud detection device 125 may select an end device 130 for fraudulent examination. For example, multifaceted fraud detection device 125 may select end device 130 based on its billing records, traffic usage, and/or other types of historical network information, as described herein.

In block 510, multifaceted fraud detection device 125 may examine an end device identifier. For example, multifaceted fraud detection device 125 may analyze the TAC of an IMEI of end device 130 and determine whether end device 130 is an authorized device and/or does not correlate to a subscription plan, as described herein.

In block 515, multifaceted fraud detection device 125 may examine end device registration. For example, multifaceted fraud detection device 125 may use capability report information for comparison to end device information indicated by an end device identifier, as described herein. Additionally, or alternatively, multifaceted fraud detection device 125 may monitor a configurable re-registration period for an application layer network by end device 130, as described herein.

In block 520, multifaceted fraud detection device 125 may examine user traffic. For example, multifaceted fraud detection device 125 may perform a tethering masking detection procedure. For example, multifaceted fraud detection device 125 may analyze user-agent information, identify end device information, and determine whether the traffic is associated with an unauthorized tethered end device, as described herein. Additionally, or alternatively, multifaceted fraud detection device 125 may perform an end device profile detection procedure. For example, multifaceted fraud detection device 125 may analyze application layer service usage of end device 130. Based on learned device-specific application layer service usage, multifaceted fraud detection device 125 may identify whether end device 130 (e.g., a tethered device or not) is using the network in a fraudulent manner. Additionally, or alternatively, multifaceted fraud detection device 125 may perform an IP address manipulation detection procedure. For example, multifaceted fraud detection device 125 may determine that end device 130 is disconnecting and re-connecting beyond a threshold value during a configured time period, as described herein. Multifaceted fraud detection device 125 may facilitate the use of a static IP address for end device 130 so that control plane and/or user plane traffic may be analyzed for fraudulent activity.

In block 525, multifaceted fraud detection device 125 may examine end device 130. For example, multifaceted fraud detection device 125 may perform an OS detection procedure. As an example, multifaceted fraud detection device 125 may transmit a message to end device 130, receive a message responsive to the transmitted message, and analyze the message to determine the OS of end device 130, as described herein. Additionally, or alternatively, multifaceted fraud detection device 125 may perform a network port scanning procedure. For example, multifaceted fraud detection device 125 may analyze active ports that end device 130 uses to communicate traffic, as described herein. Additionally, or alternatively, multifaceted fraud detection device 125 may perform an end device profile procedure. For example, multifaceted fraud detection device 125 may analyze applications, features, and/or settings associated with end device 130 based on communication with an end device diagnostics application, as described herein.

In block 530, multifaceted fraud detection device 125 may calculate a score value. For example, multifaceted fraud detection device 125 may calculate a score value to each examination procedure. Additionally, or alternatively, multifaceted fraud detection device 125 may calculate a total score value based on an aggregation of examination procedures performed. According to some exemplary embodiments, an examination procedure may be assigned a different weight or scalar value relative to another examination procedure. According to other exemplary embodiments, each examination procedure may be equally weighted.

In block 535, multifaceted fraud detection device 125 may determine whether fraud is detected. For example, multifaceted fraud detection device 125 may compare the score value to a threshold value. When the threshold value is satisfied, multifaceted fraud detection device 125 may determine that fraudulent activity has been detected. When the threshold value is not satisfied, multifaceted fraud detection device 125 may determine that fraudulent activity has not been detected.

When multifaceted fraud detection device 125 determines that fraud is detected (block 535—YES), multifaceted fraud detection device 125 may invoke a remedial procedure (block 540). For example, the remedial procedure may prevent current network usage and/or prospective network usage by end device 130.

When multifaceted fraud detection device 125 determines that fraud is not detected (block 535—NO), process 500 may end (block 545). For example, multifaceted fraud detection device 125 may log the results of the fraud examination.

FIG. 5 illustrates an exemplary process of the multifaceted detection of fraudulent data usage service, according to other exemplary embodiments, the multifaceted detection of fraudulent data usage service may perform additional operations, fewer operations, and/or different operations than those illustrated and described As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the process illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   selecting, by a network device, an end device for examination of fraudulent activity;
   examining, by the network device based on the selecting, an end device identifier of the end device;
   examining, by the network device, registration information of the end device, wherein the registration information includes information indicating whether the end device registers and re-registers with an application layer network according to a prescribed schedule set by the application layer network and multiple registrations and attachments of the end device with a radio access network and a core network;
   examining, by the network device, user traffic of the end device;
   examining, by the network device, operational data of the end device, wherein the operational data includes a network port and associated network port number and usage of the network port and network port number relative to an application service at the end device;
   determining, by the network device based on results of the examinations of the end device identifier, the registration information, the user traffic, and the operational data, whether the end device exhibits the fraudulent activity; and assigning, by the network device based on determining that the end device exhibits the fraudulent activity, a static network address to the end device.

2. The method of claim 1, further comprising:

calculating, by the network device, an aggregate value based on the results of the examinations; and comparing, by the network device, the aggregate value to a threshold value.

3. The method of claim 1, wherein the examining of the end device identifier comprises:

comparing, by the network device, at least a portion of the end device identifier to end device information that includes manufacturer and model information; and determining, by the network device based on the comparing, whether the end device is an authorized device.

4. The method of claim 1, wherein the examining of the registration information comprises:

examining, by the network device, a capability report received from the end device during an initial registration with the core network.

5. The method of claim 1, wherein the examining of the user traffic comprises:

determining, by the network device, whether the end device connects to and disconnects from the core network a threshold number of times during a time period; and determining, by the network device, whether the end device uses application layer services that do not relate to a device type of the end device.

6. The method of claim 1, wherein the examining of the user traffic comprises:

obtaining, by the network device from the user traffic, end device information including manufacturer, model number, and software version of the end device; and determining, by the network device based on the end device information, whether the user traffic of the end device violates a data usage limit.

7. The method of claim 1, further comprising:

receiving, by the network device, from at least one of a radio access network device of the radio access network, a core device of the core network, or a probe device, the end device identifier, the registration information, the user traffic, and the operational data.

8. The method of claim 1, wherein the network device is a radio access network device of the radio access network, a core device of the core network, or a probe device.

9. A network device comprising:

a processor that is configured to:

select an end device for examination of fraudulent activity;

examine, based on the selection, an end device identifier of the end device;

examine registration information of the end device, wherein the registration information includes information indicating whether the end device registers and re-registers with an application layer network according to a prescribed schedule set by the application layer network and multiple registrations and attachments of the end device with a radio access network and a core network;

examine user traffic of the end device;

examine operational data of the end device, wherein the operational data includes a network port and associated network port number and usage of the network port and network port number relative to an application service number and usage at the end device;

determine based on results of the examinations of the end device identifier, the registration information, the user traffic, and the operational data, whether the end device exhibits the fraudulent activity; and assign, based on a determination that the end device exhibits the fraudulent activity, a static network address to the end device.

10. The network device of claim 9, wherein the processor is further configured to:

calculate an aggregate value based on the results of the examinations; and compare the aggregate value to a threshold value.

11. The network device of claim 9, wherein when examining the end device identifier, the processor is further configured to:

compare at least a portion of the end device identifier to end device information that includes manufacturer and model information; and determine, based on the comparison, whether the end device is an authorized device.

12. The network device of claim 9, wherein when examining the registration information, the processor is further configured to:

examine a capability report received from the end device during an initial registration with the core network.

13. The network device of claim 9, wherein when examining the user traffic, the processor is further configured to:

determine whether the end device connects to and disconnects from the core network a threshold number of times during a time period; and determine whether the end device uses application layer services that do not relate to a device type of the end device.

14. The network device of claim 9, wherein when examining the user traffic, the processor is further configured to:

obtain, from the user traffic, end device information including manufacturer, model number, and software version of the end device; and determine, based on the end device information, whether the user traffic of the end device violates a data usage limit.

15. The network device of claim 9, wherein the processor is further configured to:

receive from at least one of a radio access network device of the radio access network, a core device of the core network, or a probe device, the end device identifier, the registration information, the user traffic, and the operational data.

16. The network device of claim 9, wherein the network device is a radio access network device of the radio access network, a core device of the core network, or a probe device.

17. A non-transitory computer-readable storage medium storing instructions executable by a processor of a network device, wherein the instructions are configured to:

select an end device for examination of fraudulent activity;

examine, based on the selection, an end device identifier of the end device;

examine registration information of the end device, wherein the registration information includes information indicating whether the end device registers and re-registers with an application layer network according to a prescribed schedule set by the application layer network and multiple registrations and attachments of the end device with a radio access network and a core network;

examine user traffic of the end device;

examine operational data of the end device, wherein the operational data includes a network port and associated network port number and usage of the network port and network port number relative to an application service number and usage at the end device;

determine based on results of the examinations of the end device identifier, the registration information, the user traffic, and the operational data, whether the end device exhibits the fraudulent activity; and assign, based on a determination that the end device exhibits the fraudulent activity, a static network address to the end device.

18. The non-transitory computer-readable storage medium of claim 17, wherein the instructions are further configured to:

calculate an aggregate value based on the results of the examinations; and compare the aggregate value to a threshold value.

19. The non-transitory computer-readable storage medium of claim 17, wherein the instructions are further configured to:

receive from at least one of a radio access network device of the radio access network, a core device of the core network, or a probe device, the end device identifier, the registration information, the user traffic, and the operational data.

20. The non-transitory computer-readable storage medium of claim 17, wherein the instructions are further configured to:

obtain, from the user traffic, end device information including manufacturer, model number, and software version of the end device; and determine, based on the end device information, whether the user traffic of the end device violates a data usage limit.

* * * * *